(12) United States Patent
Tada

(10) Patent No.: US 10,592,724 B2
(45) Date of Patent: Mar. 17, 2020

(54) INFORMATION OUTPUT METHOD AND INFORMATION PROCESSING DEVICE

(71) Applicant: FUJITSU LIMITED, Kawasaki-shi, Kanagawa (JP)

(72) Inventor: Takatoshi Tada, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/335,075

(22) Filed: Oct. 26, 2016

(65) Prior Publication Data

US 2017/0124422 A1 May 4, 2017

(30) Foreign Application Priority Data

Oct. 29, 2015 (JP) .................................. 2015-213313

(51) Int. Cl.
*G06K 9/00* (2006.01)

(52) U.S. Cl.
CPC ................................ *G06K 9/00201* (2013.01)

(58) Field of Classification Search
CPC ........ G02B 2027/0178; G02B 27/0093; G02B 27/017; G02B 2027/014; G02B 2027/0118; G02B 27/0172; G02B 5/30; G02B 27/0176; G02B 2027/0138; G02B 27/144; G02B 2027/0147; G02B 2027/0112;

(Continued)

(56) References Cited

U.S. PATENT DOCUMENTS

| 5,748,199 A | * | 5/1998 | Palm | ................... | H04N 13/133 |
| | | | | | 345/473 |
| 5,850,352 A | * | 12/1998 | Moezzi | ................ | H04N 13/139 |
| | | | | | 345/419 |

(Continued)

FOREIGN PATENT DOCUMENTS

| JP | 2006-338221 A | 12/2006 |
| JP | 2008-145594 | 6/2008 |

(Continued)

OTHER PUBLICATIONS

Japanese Office Action dated Jul. 23, 2019 in Japanese Application No. 2015-213313.

(Continued)

*Primary Examiner* — Aklilu K Woldemariam
(74) *Attorney, Agent, or Firm* — Xsensus LLP

(57) ABSTRACT

A method for outputting information corresponding to an object includes identifying a shape of the object, receiving an image of a label corresponding to the object, generating a three-dimensional model of the object to which the image of the label is virtually attached based on the identified shape of the object and the image of the label, generating a plurality of pieces of two-dimensional image data corresponding to the three-dimensional model of the object, the plurality of pieces of two-dimensional image data being generated by changing a virtual capturing position for capturing the three-dimensional model of the object, comparing input image data to the plurality of pieces of two-dimensional image data and outputting the information corresponding to the object based on a positive comparison between the input image data and at least one of the plurality of pieces of two-dimensional image data.

14 Claims, 20 Drawing Sheets

(58) Field of Classification Search
CPC ............ G02B 2027/0123; H04W 4/02; H04W 12/06; H04W 12/02; H04W 4/008; H04W 4/023; H04W 4/206; H04W 4/00; H04W 4/027; H04W 88/02; H04W 4/001; H04W 4/18; H04W 8/22; G08C 17/02; G08C 2201/32; G08C 2201/70; G08C 2201/91; G08C 2201/93; G08C 23/04; G06F 3/0482; G06F 3/0485; G06F 3/04886; G06F 3/04842; G06F 3/017; G06F 3/023; G06F 3/0481; G06F 3/04817; G06F 3/04847; G06T 2207/10004; G06T 1/005; G06T 1/0092; G06T 2201/0065; G06T 7/73; G06T 1/0021; G06T 19/006; G06T 1/0064; G06T 2200/24; G06T 2201/0052; G06T 11/60; G06T 2200/04; G06T 2207/30196; G06T 2207/20201; G06T 2207/30216; G06T 5/003; G06T 2207/20221; G06T 2207/30168; A23L 35/00; A23L 3/00; A23L 5/00; A47J 36/00; A47J 36/32; F25D 2400/361; F25D 2500/06; F25D 2700/02; F25D 2700/06; F25D 2700/08; F25D 29/00; G01N 33/02; G06Q 10/0875; G09B 19/0092; G06K 9/40; G06K 9/00248; G06K 9/0061; G06K 9/3208; G06K 9/4652; G06K 9/48
USPC .......................... 382/100, 103, 118, 254, 275
See application file for complete search history.

(56) References Cited

U.S. PATENT DOCUMENTS

| | | | | |
|---|---|---|---|---|
| 6,858,826 | B2 * | 2/2005 | Mueller | G01B 11/00 250/208.1 |
| 7,006,881 | B1 * | 2/2006 | Hoffberg | G05B 15/02 700/17 |
| 7,098,435 | B2 * | 8/2006 | Mueller | G01B 11/00 250/208.1 |
| 7,900,384 | B2 * | 3/2011 | Schnuckle | A47G 19/2227 40/324 |
| 8,213,737 | B2 * | 7/2012 | Steinberg | G06K 9/00248 382/275 |
| 8,831,279 | B2 * | 9/2014 | Rodriguez | G06T 11/60 382/103 |
| 9,600,982 | B2 * | 3/2017 | MacIntosh | |
| 9,767,539 | B2 * | 9/2017 | Zamfir | G06K 9/00248 |
| 2003/0066949 | A1 * | 4/2003 | Mueller | G01B 11/00 250/208.1 |
| 2008/0195315 | A1 * | 8/2008 | Hu | G01C 21/3647 701/455 |
| 2008/0291438 | A1 * | 11/2008 | Akkerman | B07C 5/3404 356/240.1 |
| 2011/0098056 | A1 * | 4/2011 | Rhoads | G01C 21/20 455/456.1 |
| 2012/0134548 | A1 * | 5/2012 | Rhoads | G06Q 30/06 382/118 |
| 2012/0206391 | A1 * | 8/2012 | Kim | H04M 1/7253 345/173 |
| 2012/0275642 | A1 * | 11/2012 | Aller | H04M 1/72522 382/100 |
| 2014/0052555 | A1 * | 2/2014 | MacIntosh | G06Q 20/208 705/23 |
| 2014/0334721 | A1 * | 11/2014 | Cervin | G06K 9/00483 382/160 |
| 2015/0077520 | A1 * | 3/2015 | Ohba | A63F 13/213 348/47 |
| 2015/0234477 | A1 * | 8/2015 | Abovitz | G06F 16/7837 382/103 |
| 2015/0309264 | A1 * | 10/2015 | Abovitz | G02B 6/34 385/33 |
| 2016/0078627 | A1 * | 3/2016 | Daon | A61B 90/39 382/103 |
| 2016/0335578 | A1 | 11/2016 | Sagawa | |
| 2016/0350715 | A1 * | 12/2016 | Minvielle | G06Q 10/0875 |
| 2017/0235983 | A1 * | 8/2017 | Alwesh | G06F 17/00 235/385 |

FOREIGN PATENT DOCUMENTS

| | | |
|---|---|---|
| JP | 2011-175386 A | 9/2011 |
| WO | 2015/107665 A1 | 7/2015 |

OTHER PUBLICATIONS

Japanese Office Action dated Dec. 3, 2019, issued in corresponding Japanese Patent Application No. 2015-213313.

* cited by examiner

FIG. 5

| CONTAINER CODE | CONTAINER NAME | SHAPE | LABEL AREA |
|---|---|---|---|
| 01 | 1.8L GLASS BOTTLE | XXXXX | XXXXX |
| 02 | 900ML GLASS BOTTLE | XXXXX | XXXXX |
| 03 | 720ML GLASS BOTTLE | XXXXX | XXXXX |
| ⋮ | ⋮ | ⋮ | ⋮ |

FIG. 6

| REFERENCE IMAGE NUMBER | CAPTURING POSITION | ILLUMINATION CONDITION | ... |
|---|---|---|---|
| A01 | XXXXX | XXXXX | ... |
| A02 | XXXXX | XXXXX | ... |
| ⋮ | ⋮ | ⋮ | ... |
| B01 | XXXXX | XXXXX | ... |
| B02 | XXXXX | XXXXX | ... |
| ⋮ | ⋮ | ⋮ | ... |
| C01 | XXXXX | XXXXX | ... |
| C02 | XXXXX | XXXXX | ... |
| ⋮ | ⋮ | ⋮ | ... |

FIG. 7

| ARTICLE | LABEL IMAGE NUMBER | CONTAINER CODE | REFERENCE IMAGE NUMBER | CONTENT | ... |
|---|---|---|---|---|---|
| BRAND A | 001 | 01 | A01, A02, ... | XXXXX | ... |
| BRAND B | 002 | 02 | B01, B02, ... | XXXXX | ... |
| BRAND C | 003 | 03 | C01, C02, ... | XXXXX | ... |
| ⋮ | ⋮ | ⋮ | ⋮ | ⋮ | ... |

FIG. 8

| TARGET OBJECT NUMBER | ARTICLE | ... |
|---|---|---|
| 001 | BRAND A | ... |
| 002 | BRAND B | ... |
| 003 | BRAND C | ... |
| ⋮ | ⋮ | ... |

INFORMATION OUTPUT METHOD AND INFORMATION PROCESSING DEVICE

CROSS-REFERENCE TO RELATED APPLICATION

This application is based upon and claims the benefit of priority of the prior Japanese Patent Application No. 2015-213313, filed on Oct. 29, 2015, the entire contents of which are incorporated herein by reference.

FIELD

The embodiments discussed herein are related to an image recognition technology.

BACKGROUND

In a related art, as a technology by which an article that appears in a captured image is determined, image recognition is known. In such image recognition, a reference image in which an article that is a determination target appears is prepared in advance, and for example, a certain article is determined by image recognition processing such as pattern matching between the reference image and the captured image. A technology in a related art is discussed, for example, in Japanese Laid-open Patent Publication No. 2008-145594.

SUMMARY

According to an aspect of the invention, a method for outputting information corresponding to an object includes identifying a shape of the object, receiving an image of a label corresponding to the object, generating a three-dimensional model of the object to which the image of the label is virtually attached based on the identified shape of the object and the image of the label, generating a plurality of pieces of two-dimensional image data corresponding to the three-dimensional model of the object, the plurality of pieces of two-dimensional image data being generated by changing a virtual capturing position for capturing the three-dimensional model of the object, comparing input image data to the plurality of pieces of two-dimensional image data and outputting the information corresponding to the object based on a positive comparison between the input image data and at least one of the plurality of pieces of two-dimensional image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data configuration of container information;

FIG. 6 is a diagram illustrating an example of a data configuration of capturing condition information;

FIG. 7 is a diagram illustrating an example of a data configuration of registration article information;

FIG. 8 is a diagram illustrating an example of a data configuration of recognition target object information;

DESCRIPTION OF EMBODIMENTS

For example, a label is attached to a container of liquor. In such a container, a portion to which the label is attached is curved. An image of the label may be obtained from a design source of the label. Alternatively, the image of the label may be obtained by reading the label through a scanner or the like. Therefore, it is conceived that an article may be determined by image recognition of the label using the image of the label as a reference image. However, when the label is attached to the container, the label is curved, so that the identification rate becomes low even when the image of the label is used as the reference image.

Therefore, it is conceived that the reference image is obtained by actually capturing the image of the container to which the label has been attached, but a lot of containers are physically collected and the images are captured, so that the work load is high, and there is a case in which a variation occurs in the reference images due to various factors such as a capturing angle and illumination. When a variation occurs in the reference images as described above, a variation occurs in the identification rates.

An object of an embodiment is to suppress a generation variation of reference images.

Embodiments of an image generation method, an image generation program, an information processing device, and a display control method of the technology discussed herein are described in detail with reference to drawings. The technology discussed herein is not limited to such embodiments. In addition, the embodiments may be combined as appropriate in a range in which processing content is not contradicted.

First Embodiment

[System Configuration]

Figure 1:
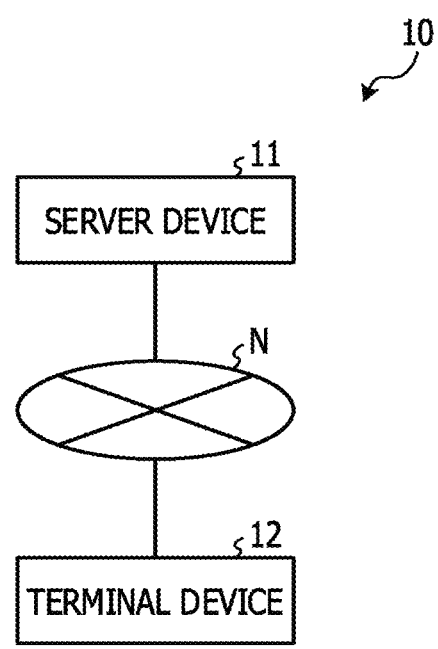
FIG. 1 is a diagram illustrating an example of a schematic configuration of a system according to a first embodiment.

First, an example of a system 10 according to a first embodiment is described. FIG. 1 is a diagram illustrating an example of a schematic configuration of the system according to the first embodiment. The system 10 is a system that determines an article that appears in a captured image. In the embodiment, for example, a case in which a brand is determined from a label by capturing an image of a container of liquor such as a 1.8 L glass bottle as an article is described as an example.

As illustrated in FIG. 1, the system 10 includes a server device 11 and a terminal device 12. The server device 11 and the terminal device 12 are coupled to each other so as to be allowed to communicate with a network N. As the network N, regardless of a wired line or wireless line, a certain type of a communication network such as a local area network (LAN) or a virtual private network (VPN) may be employed. In the example of FIG. 1, the case in which a single terminal device 12 is provided is described as an example, but the embodiment is not limited to such a case, and a certain number of the terminal devices 12 may be provided.

The server device 11 is a device that supplies determination service used to determine an article based on the captured image. The server device 11 is, for example, a computer such as a server computer. The server device 11 may be implemented as a single computer, and in addition, may be implemented as a plurality of computers. In the embodiment, a case in which the server device 11 is implemented as a single computer is described as an example.

The terminal device 12 is a device that belongs to a user who uses the determination service supplied by the server device 11. For example, the terminal device 12 is a mobile terminal device such as a smartphone or a tablet terminal. The terminal device 12 may be a computer such as a laptop personal computer or a personal computer. The terminal device 12 captures an image of an article that is a determination target in response to an operation of the user, and requests determination of an article by transmitting image data of the captured image for the determination service of the server device 11. In addition, the terminal device 12 displays a determination result of the article in accordance with a response from the determination service.

[Configuration of the Server Device 11]

Figure 2:
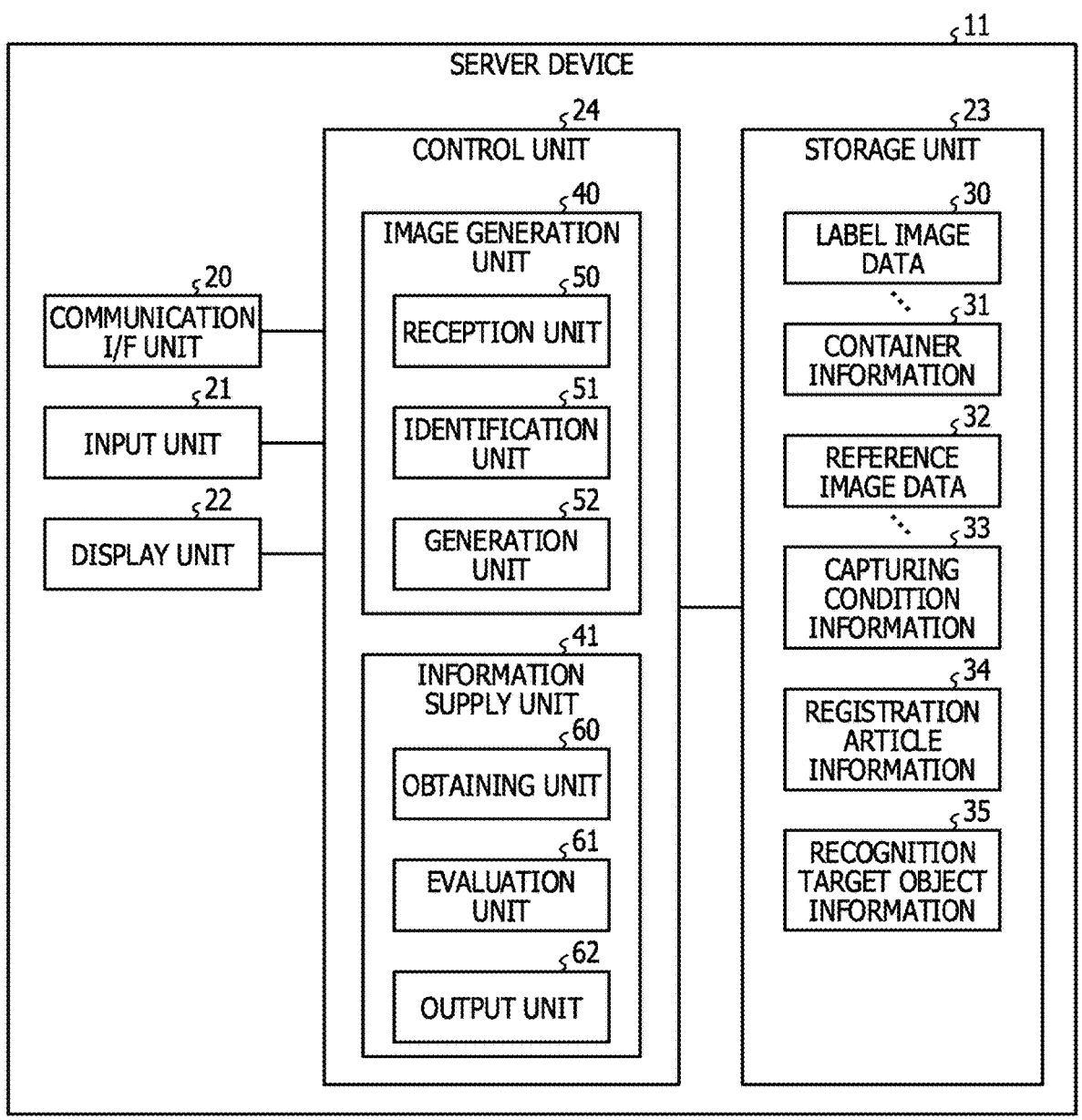
FIG. 2 is a diagram illustrating a schematic configuration of a server device according to the first embodiment.

A configuration of the server device 11 according to the first embodiment is described below. FIG. 2 is a diagram illustrating a schematic configuration of the server device according to the first embodiment. The server device 11 includes a communication interface (I/F) unit 20, an input unit 21, a display unit 22, a storage unit 23, and a control unit 24.

The communication I/F unit 20 is an interface that performs communication control with a further device. The communication I/F unit 20 transmits and receives various pieces of information to and from the further device through the network N. As the communication I/F unit 20, a network interface card such as a LAN card may be employed.

The input unit 21 is an input device through which various pieces of information are input. As the input unit 21, there is an input device that accepts an input of an operation by a mouse, a keyboard, and the like. The input unit 21 accepts inputs of various pieces of information. For example, the input unit 21 accepts an operation input related to generation of a reference image used for determination of an article, from an administrator. The input unit 21 inputs operation information indicating the accepted operation content to the control unit 24.

The display unit 22 is a display device that displays various pieces of information. As the display unit 22, there are display devices such as a liquid crystal display (LCD) and a cathode ray tube (CRT). The display unit 22 displays various pieces of information. For example, the display unit 22 displays various screens such as an operation screen.

The storage unit 23 is a storage device such as a hard disk, a solid state drive (SSD), and an optical disk. The storage unit 23 may be a semiconductor memory in which data is allowed to be rewritten such as a random access memory (RAM), a flash memory, or a nonvolatile static random access memory (NVSRAM).

The storage unit 23 stores an operating system (OS) and various programs that are executed in the control unit 24. For example, the storage unit 23 stores programs used to execute image generation processing and display control processing that are described later. In addition, the storage unit 23 stores various pieces of data used in the programs executed in the control unit 24. For example, the storage unit 23 stores label image data 30, container information 31, reference image data 32, capturing condition information 33, registration article information 34, and recognition target object information 35.

The label image data 30 is image data of a label attached to an article that is a determination target. In the embodiment, the label image data 30 corresponds to each of pieces of image data of labels of various brands, each of which is attached to a container of liquor. The label image data 30 including the label of various brands is obtained from a design source of the label of each of the brands or by reading the label of each of the brands through a scanner or the like.

Figure 3:
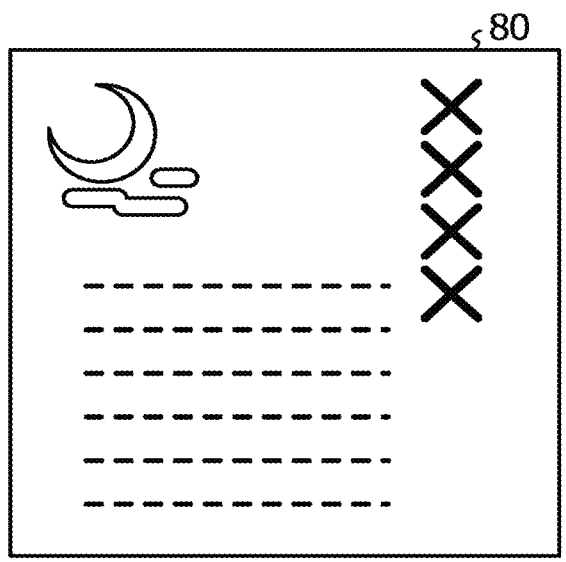
FIG. 3 is a diagram illustrating an example of a label attached to a container.

FIG. 3 is a diagram illustrating an example of a label attached to a container. It is assumed that a label 80 has a rectangular shape, and characters, graphics, and the like, are arranged for each of the brands. In the example of FIG. 3, characters are illustrated so as to be abbreviated as "XXXX". In addition, a part of the graphic is illustrated so as to be abbreviated as the horizontal broken line. For example, the label image data 30 is obtained by reading the label 80 illustrated in FIG. 3 through the scanner or the like.

Figure 4:
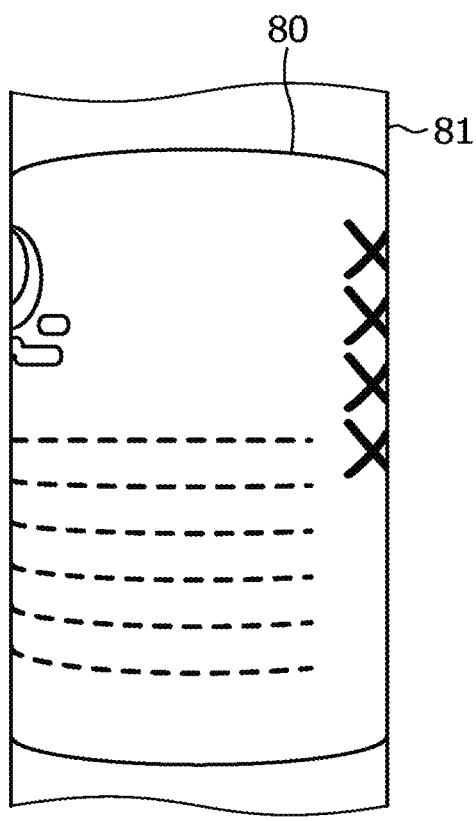
FIG. 4 is a diagram illustrating an example of a state in which the label is attached to the container.

The label 80 is typically curved when the label 80 is attached to the container. FIG. 4 is a diagram illustrating an example of a state in which the label is attached to the container. As illustrated in FIG. 4, there is a case in which the label 80 is curved when the label 80 is attached to a container 81, and the characters and the graphics are distorted, and a part or all of the characters and graphics may not appear depending on the location of the label 80. Therefore, the identification rate may become low even using the label image of the label image data 30 as a reference image.

A label image number is assigned to each of the pieces of label image data 30 as identification information used to identify the pieces of label image data 30. Each of the pieces of label image data 30 is stored, for example, so as to be converted into a size of a certain range corresponding to the size of an area of a label of a three-dimensional model of a container described later such as the number of pixels in the horizontal and vertical directions of "800×600".

The container information 31 is data in which information on a container used for an article that is a determination target is stored. For example, in the container information 31, pieces of information on the size of the container used for various brands of liquor and an area to which a label is attached are stored. FIG. 5 is a diagram illustrating an example of a data configuration of container information. As illustrated in FIG. 5, the container information 31 includes items of "container code", "container name", "shape", "label area", and the like. Each of the items of the container information 31 illustrated in FIG. 5 is an example, and the container information 31 may include another item.

The item of "container code" is an area in which identification information used to identify a container is stored. As the identification information used to identify a container, a container code is assigned to each of the containers having different sizes. In the item of "container code", a container code that has been assigned to the container is stored. The item of "container name" is an area in which the name of the container is stored. The item of "shape" is an area in which information indicating the shape of the container is stored. For example, in the item of "shape", the height of the container and the size of the outer shape such as a diameter of each portion corresponding to the height. For example, in a case of a 1.8 L glass bottle, in the item of "shape", pieces of information on the outer shape of the 1.8 L glass bottle such as the height: 39.8 cm, the bottom diameter: 10.4 cm, and the upper diameter: 3.1 cm are stored. In the item of "shape", information on the outer shape of a portion to which the label is attached may be stored. The item of "label area" is an area in which information on the area to which the label is attached is stored. For example, in the item of "label area", location information of a reference point indicating the area to which the label is attached is stored. For example, when the label is attached to the container using the corner of the upper left of the label as a reference, in the item of "label area", coordinates of a position on a container surface to which the corner of the upper left of the label is attached are stored as a reference point. In the item of "label area", coordinates of positions on the container surface at the four corners of the area to which the label is attached may be stored.

Returning to FIG. 2, the reference image data 32 is data in which a reference image that has been generated by a generation unit 52 described later is stored. As identification information used to identify a reference image, a reference image number is assigned to the reference image data 32.

The capturing condition information 33 is data in which a capturing condition when the reference image has been generated by the generation unit 52 described later is stored. For example, in the capturing condition information 33, as the capturing condition, pieces of information on a capturing position and an illumination condition for the container are stored.

FIG. 6 is a diagram illustrating an example of a data configuration of capturing condition information. As illustrated in FIG. 6, the capturing condition information 33 includes items of "reference image number", "capturing position", and "illumination condition". Each of the items of the capturing condition information 33 illustrated in FIG. 6 is an example, and the capturing condition information may include another item.

The item of "reference image number" is an area in which identification information of the reference image data 32 is stored. In the item of "reference image number", the reference image number that has been assigned to the reference image data 32 is stored. The item of "capturing position" is an area in which a capturing position when the reference image data 32 the reference image number of which has been stored in the item of "reference image number" has been generated is stored. The item of "illumination condition" is an area in which an illumination condition when the reference image data 32 the reference image number of which has been stored in the item of "reference image number" has been generated is stored.

Returning to FIG. 2, the registration article information 34 is data in which information on an article the reference image of which has been registered is stored. For example, the brand of the article the reference image of which has been registered, a label image number of the used label image data 30, a container code, and the like, are stored in the registration article information 34 so as to be associated with each other.

FIG. 7 is a diagram illustrating an example of a data configuration of registration article information. As illustrated in FIG. 7, the registration article information 34 includes items of "article", "label image number", "container code", "reference image number", "content", and the like. Each of the items of the registration article information 34 illustrated in FIG. 7 is an example, and the registration article information 34 may include another item.

The item of "article" is an area in which information on the article the determination reference image of which has been registered is stored. In the embodiment, in the item of "article", the name of the brand of the liquor the reference image of which has been registered is stored. The item of "label image number" is an area in which a label image number of the label image data 30 of the article that has been registered in the item of "article" is stored. The item of "container code" is an area in which a container code of the container used for the article that has been registered in the item of "article" is stored. The item of "reference image number" is an area in which a reference image number of the reference image that has been generated for the article that has been registered in the item of "article" is stored. The item of "content" is an area in which information on a content related to the article that has been registered in the item of "article" is stored. For example, when a message related to the article is supplied as content, a message to be supplied is stored in the item of "content". In addition, when an image is supplied as a content, a storage destination of an image to be supplied is stored in the item of "content". In addition, when a link destination of related information is supplied as a content, a uniform resource locator (URL) of the link destination of the related information is stored in the item of the content.

The recognition target object information 35 is data in which various pieces of information on the article that has been determined from the captured image is stored. For example, information on the article that has been determined so as to be associated with the captured image is stored in the recognition target object information 35.

FIG. 8 is a diagram illustrating an example of a data configuration of recognition target object information. As illustrated in FIG. 8, the recognition target object information 35 includes items of "target object number", "article", and the like. Each of the items of the recognition target object information 35 illustrated in FIG. 8 is an example, and the recognition target object information 35 may include another item.

The item of "target object number" is an area in which identification information used to identify a target object that has been determined to be an article from the captured image is stored. A target object number used to identify a target object is assigned to the target object that has been determined from the captured image as identification information. In the item of "target object number", a target object number assigned to the article that has been determined from the captured image is stored. The item of "article" is an area in which the article in which the target object has been determined is stored. In the embodiment, in the item of "article", the name of a liquor brand in which the target object has been determined is stored.

Returning to FIG. 2, the control unit 24 is a device that controls the server device 11. As the control unit 24, an electronic circuit such as a central processing unit (CPU) or a micro processing unit (MPU), or an integrated circuit such as an application specific integrated circuit (ASIC) or a field programmable gate array (FPGA) may be employed. The control unit 24 includes an internal memory used to store control data and programs in which various pieces of processing procedures have been defined, and executes various pieces of processing by such data and programs. The control unit 24 functions as various processing units when the various programs operate. For example, the control unit 24 includes an image generation unit 40 and an information supply unit 41.

The image generation unit 40 is a processing unit that generates a reference image used for determination of an article. In the embodiment, the image generation unit 40 includes a reception unit 50, an identification unit 51, and the generation unit 52.

The reception unit 50 performs various types of reception. For example, the reception unit 50 causes the display unit 22 to display an operation screen and accepts various operations for the operation screen, from the input unit 21. For example, the reception unit 50 causes the display unit 22 to display a registration image used to register information on an article to be determined, and accepts inputs of various pieces of information on the article for the registration image, from the input unit 21.

Figure 9:
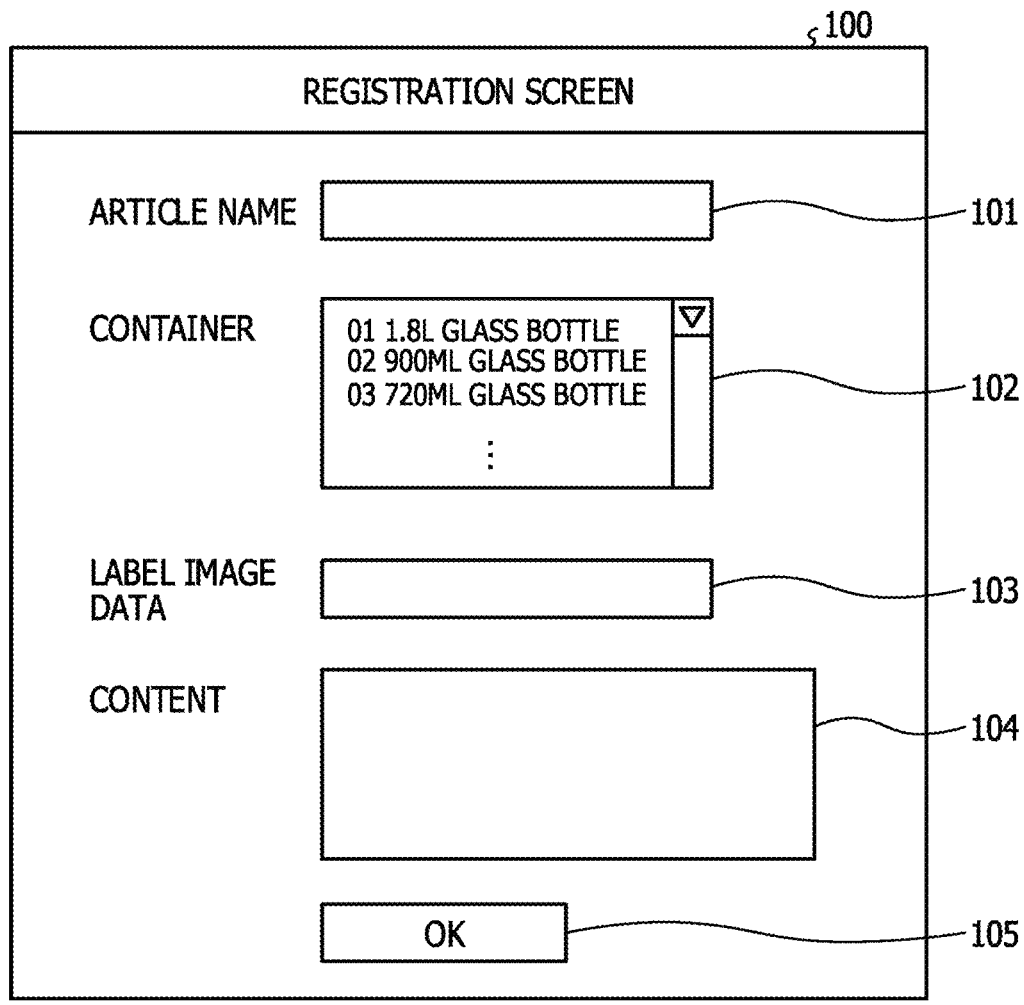
FIG. 9 is a diagram illustrating an example of a registration screen.

FIG. 9 is a diagram illustrating an example of a registration screen. As illustrated in FIG. 9, a registration screen 100 includes a name area 101 used to input the name of an article to be registered and a container specification area 102 used to specify the type of a container of the article to be registered by a container code. In addition, the registration screen 100 includes a label specification area 103 used to specify the label image data 30 and a content input area 104 used to input a content. In the registration screen 100, an OK button 105 is provided. The reception unit 50 accepts inputs of the name of the article to be registered, the type of the container of the article to be registered, the label image data 30, and a content to be supplied, through the registration screen 100.

For example, an administrator who runs the determination service inputs the name of the liquor brand to be registered, to the name area 101, and specifies the type of the container of the liquor to be registered, through the container specification area 102 using a container code. In addition, the administrator specifies the label image data 30 of the liquor to be registered, through the label specification area 103, and inputs a message related to the article including pieces of information on the feature and brewery of the liquor, to the content input area 104. In addition, the administrator specifies the OK button 105.

The identification unit 51 performs various types of identification. For example, the identification unit 51 identifies a shape corresponding to the input type of the container. For example, the identification unit 51 reads the shape corresponding to the used container code from the container information 31, and identifies the shape corresponding to the type of the container.

The generation unit 52 performs various types of generation. For example, the generation unit 52 generates a two-dimensional image data of the label in a state in which the label image indicated by the label image data 30 that has been specified through the label specification area 103 is distorted depending on the shape that has been identified by the identification unit 51. For example, the generation unit 52 forms a three-dimensional model of a container having the identified shape in a virtual three-dimensional space using three-dimensional space model software. In addition, the generation unit 52 reads a label area corresponding to the specified container code from the container information 31 and identifies a reference point of a label attachment area of the container. In addition, the generation unit 52 forms a model to which the image of the label has been virtually attached as a texture by using the position of the reference point of the formed three-dimensional model of the container as the end of upper left of the label as a reference. The generation unit 52 may not form a three-dimensional model of the whole container, and may simplify the three-dimensional model so as to form a portion to which the label has been attached.

Figure 10:
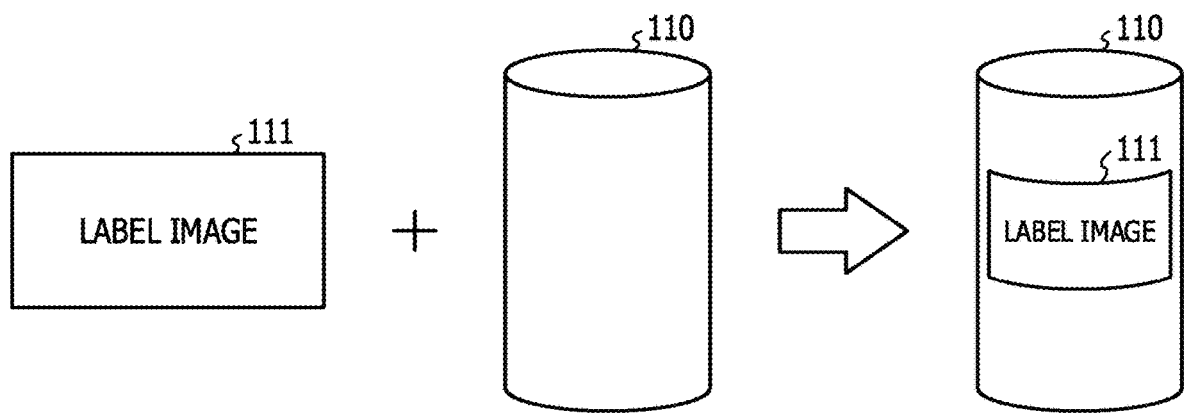
FIG. 10 is a diagram schematically illustrating an example of a flow in which a label image is attached to a three-dimensional model of a container as a texture.

FIG. 10 is a diagram schematically illustrating an example of a flow in which the label image is attached to the three-dimensional model of the container as the texture. In the example of FIG. 10, the three-dimensional model of the container is simplified as a cylindrical polygon 110 corresponding to the portion to which the label has been attached. For example, as illustrated in FIG. 10, the generation unit 52 forms a three-dimensional model that has been obtained by attaching a label image 111 to a label attachment area of the peripheral surface of the cylindrical polygon 110 as a texture. As a result, the label image 111 is distorted similar to the state of being attached to the actual container.

The generation unit 52 generates two-dimensional image data of the label in the state in which the image data of the label has been distorted using the formed three-dimensional model in the virtual three-dimensional space. For example, the generation unit 52 generates a plurality of pieces of two-dimensional image data by changing the capturing position and the illumination condition for the formed three-dimensional model.

Figure 11:
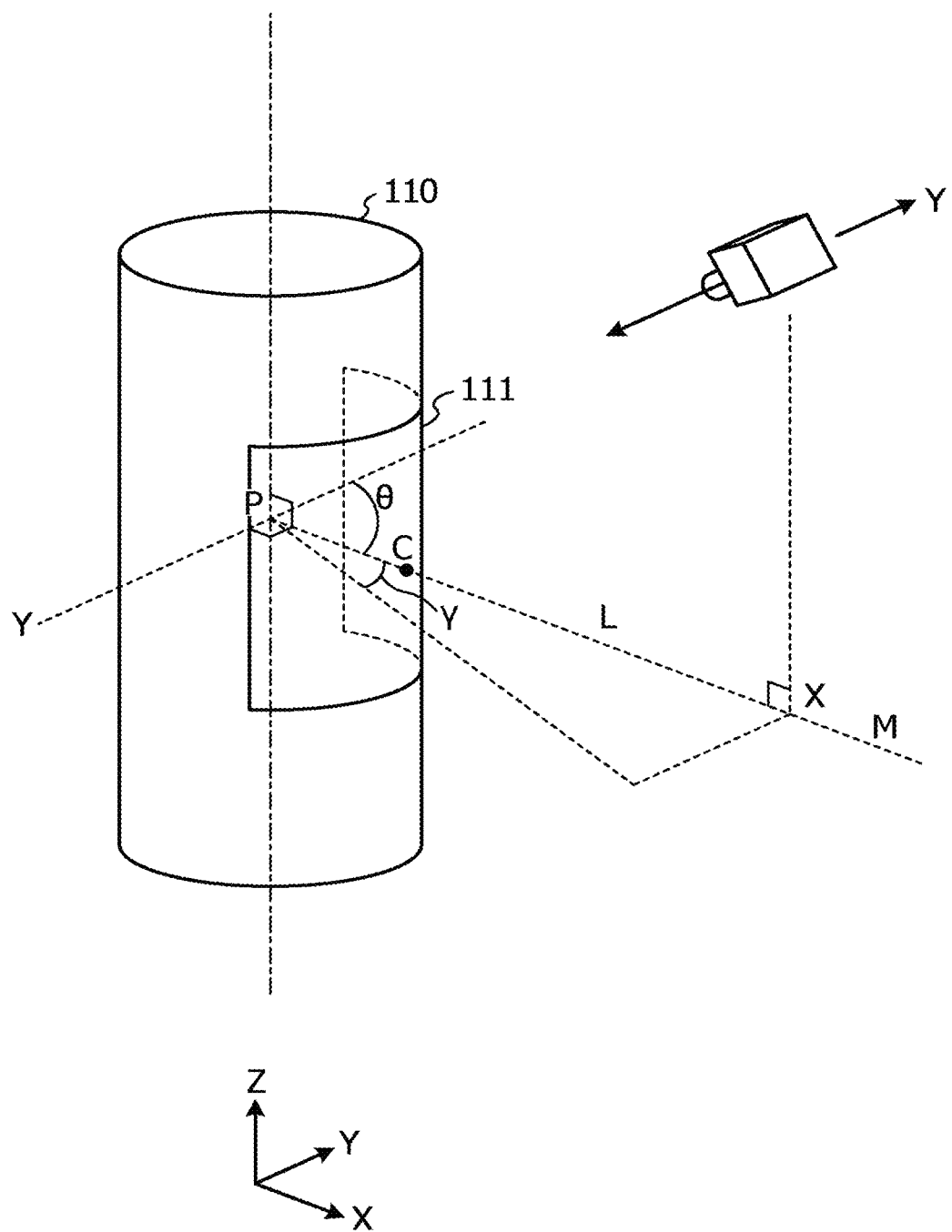
FIG. 11 is a diagram illustrating an example of a relationship of a capturing position for the three-dimensional model of the container.

FIG. 11 is a diagram illustrating an example of a relationship of the capturing position for the three-dimensional model of the container. In the example of FIG. 11, the center line of the cylindrical polygon 110 is set as a z axis, and the upper portion for the virtually attached label image 111 is set as the plus direction of the z axis, and the lower portion for the label image 111 is set as the minus direction of the z axis. In addition, in the example of FIG. 11, a line that is perpendicular to the z axis and passes through the center point c of the label image 111 is set as an x axis, the direction from the z axis to the center point c is set as the plus direction of the x axis, and the direction from the center point c to the z axis direction is set as the minus direction of the x axis. In addition, in the example of FIG. 11, an axis that is perpendicular to the z axis and the x axis is set as a y axis. In addition, in the example of FIG. 11, a point at which the z axis and the x axis that passes through the center point c intersect is set as an origin point p.

For example, the generation unit 52 changes an angle $\theta$ for the x axis on the xz plane by a certain angle (for example, 10°) at the position by a certain distance L from the origin point p in the x axis direction within a certain range (for example, $-40° \leq \theta \leq 60°$) of the plus and minus directions in the x axis direction. The generation unit 52 generates two-dimensional image data in which the center point c corresponds to the optical axis direction of a camera by changing an angle γ for the x axis on the xy plane by a certain angle (for example, 10°) at each position from the origin point p in the z axis direction with in a certain range (for example, −60°≤γ≤60°) of the plus and minus directions in the y axis direction. The generation unit 52 generates two-dimensional image data by changing the position of light sources, the number of light sources, and the brightness of light output from the light sources in a three-dimensional space, as an illumination condition. For example, the generation unit 52 generates two-dimensional image data when a light source is arranged at the position of the angle θ of 0°, 45°, 60°, or 80° at the position by a certain distance M (M>L) from the origin point p in the x axis direction. Various parameters that define the capturing position and the illumination condition may be set in advance or may be set through a screen or the like.

Here, typically, in a sales floor, a product such as liquor tends to be displayed so as to be located lower than the height of the viewpoint of a customer, and typically is viewed from the front of the product or obliquely upward from the product. Therefore, the generation unit 52 may change the angle θ by a certain angle within a certain range (for example, 0≤θ≤60°) of the plus direction in the z axis direction.

In addition, the distortion of the label becomes large as the angel θ by which the customer views the label from the above becomes large. Therefore, the generation unit 52 may generate a plurality of pieces of two-dimensional image data by reducing a change in the capturing position as the capturing position corresponds to the upper position for the label. For example, the generation unit 52 reduces the change in the angle θ as the angle corresponds to the upper position such as "angle θ=0°, 30°, 45°, 55°, and 60°". In addition, the generation unit 52 may generate two-dimensional image data at each of the capturing positions by changing the angle γ in a unit of 30° in a case of "angle θ=0°", changing the angle γ in a unit of 25° in a case of "angle θ=45°", changing the angle γ in a unit of 20° in a case of "angle θ=55°", and changing the angle γ in a unit of 10° in a case of "angle θ=60°". As a result, a reference image may be generated in a unit of a smaller angle as the angle corresponds to the label having larger distortion.

Figure 12:
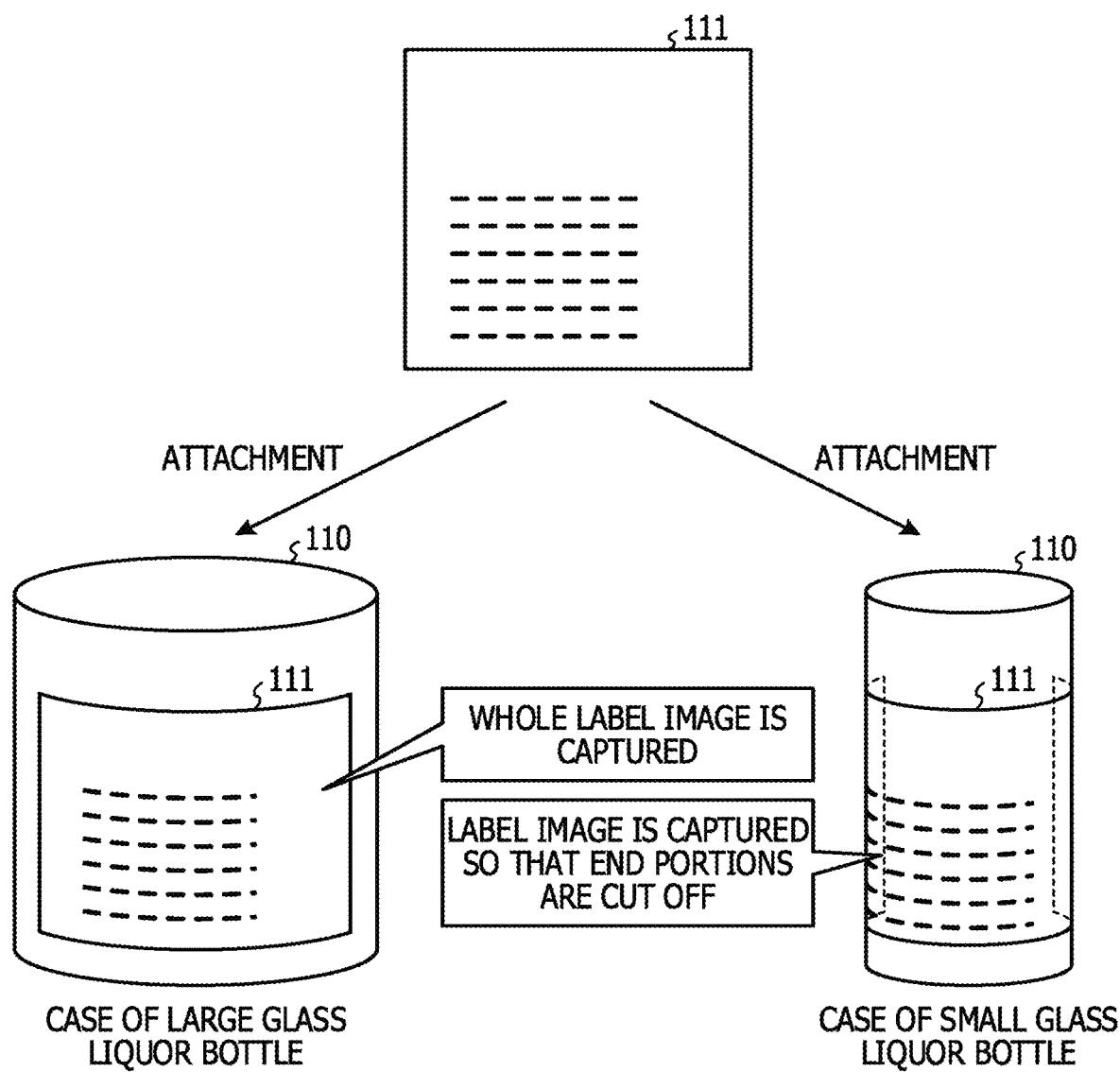
FIG. 12 is a diagram illustrating an example in which the label image of the container is attached as the texture.

A degree of the distortion of the label is different depending on the diameter of a container, and the distortion becomes large in a small container, and the distortion becomes small in a large container. FIG. 12 is a diagram illustrating an example in which a label image of a container has been attached as a texture. When the generation unit 52 has generated the two-dimensional image data in the state illustrated in FIG. 12, the distortion of the label image 111 is large in the fine container, so that two-dimensional image data in which the left and right end portions of the label image 111 are cut off is generated. In addition, the distortion of the label image 111 is small in the large container, so that two-dimensional image data in which the left and right end portions of the label image 111 also appear is generated.

The generation unit 52 assigns a reference image number to each of the piece of generated two-dimensional image data and stores the two-dimensional image data as the reference image data 32 in the storage unit 23. In addition, the generation unit 52 registers the capturing position and the illumination condition of each of the pieces of reference image data 32 in the capturing condition information 33. In addition, the generation unit 52 registers the name of an article to be registered, a label image number of the label image data 30, a container code of a container of the article to be registered, a message, and the reference image number of each of the pieces of generated reference image data 32 that have been input to the registration screen 100, in the registration article information 34.

The information supply unit 41 is a processing unit that determines an article by performing image recognition on a captured image and supplies information depending on a determination result. In the embodiment, the information supply unit 41 includes an obtaining unit 60, an evaluation unit 61, and an output unit 62.

The obtaining unit 60 performs various types of obtaining. For example, the obtaining unit 60 obtains image data of the captured image, which has been transmitted from the terminal device 12.

The evaluation unit 61 performs various types of evaluation. For example, the evaluation unit 61 calculates an evaluation value indicating a similarity by performing pattern matching between the image data of the captured image, which has been obtained by the obtaining unit 60, and each of the pieces of reference image data 32. In addition, the evaluation unit 61 determines an article based on the calculated evaluation value. For example, the evaluation unit 61 determines an article of the reference image data 32 in which the highest evaluation value has been calculated, to be an article that appears in the captured image when the highest evaluation value is a certain threshold value or more by which an article is determined.

In a reference image that has been captured in front of the label, that is, at "angle θ=0" and "angle γ=0", distortion of characters and graphic of the label is relatively small. Therefore, in an evaluation value that has been calculated from the reference image that has been captured in front of the label, the reliability of evaluation of whether there is a similarity is high. Therefore, the evaluation unit 61 may evaluate a similarity by calculating an evaluation value so that weight of a score of two-dimensional image data that has been generated at the capturing position in front of the label is increased. For example, when there are reference images that have been captured at "angles θ=0°, 30°, 45°, 55°, and 60°", the evaluation unit 61 may multiply an evaluation value in the reference image that has been captured at "angles θ=0°" by a weight 2.0, multiply an evaluation value in the reference image that has been captured at "angle θ=30°" by a weight 1.2, multiply an evaluation value in the reference image that has been captured at "angle θ=55°" by a weight 0.75, and multiply an evaluation value in the reference image that has been captured at "angle θ=60°" by a weight 0.6.

When an article that appears in the captured image has been determined, the evaluation unit 61 assigns a target object number to the target object that has been determined from the captured image, and registers the target object number and the article that has been determined to be the target object in the recognition target object information 35.

The output unit 62 performs various types of output. For example, when the article has been determined from the captured image by the evaluation unit 61, the output unit 62 transmits various pieces of information to the terminal device 12 that is a transmission source of the captured image correspondingly to the determined article. For example, the output unit 62 transmits the name of a liquor brand stored in the item of "article" of the registration article information 34 and a message stored in the item of "content" of the registration article information 34, to the terminal device 12 that is the transmission source of the captured image, correspondingly to the determined article.

The terminal device 12 performs display based on the various pieces of information that have been transmitted from the server device 11. For example, when the terminal device 12 has received the name of the liquor brand and the message from the server device 11, the terminal device 12 displays the name of the liquor brand and the message by associating the name of the liquor brand and the message with the captured image.

Figure 13:
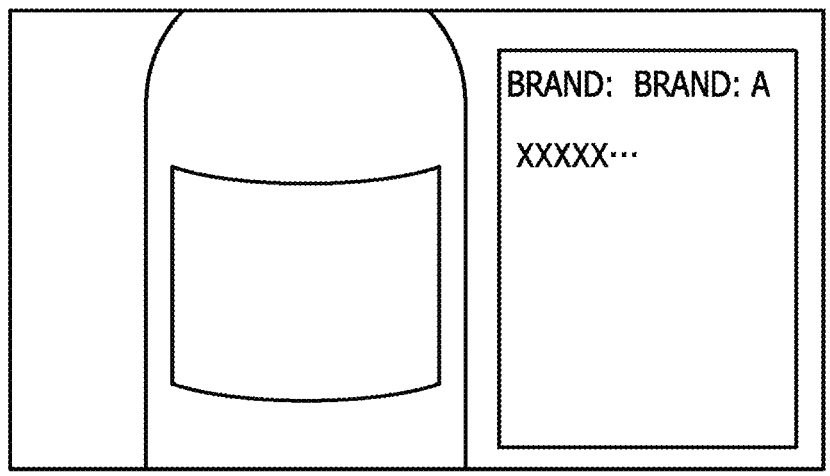
FIG. 13 is a diagram illustrating an example of a screen displayed on a terminal device.

FIG. 13 is a diagram illustrating an example of a screen displayed on the terminal device. In the example of FIG. 13, the name of the liquor brand and the message are displayed by being associated with the captured image of the liquor. As a result, the user of the terminal device 12 may grasp information on the name of the brand, and the feature and brewery of the liquor, and the like, from the displayed content.

[Flow of the Processing]

Figure 14:
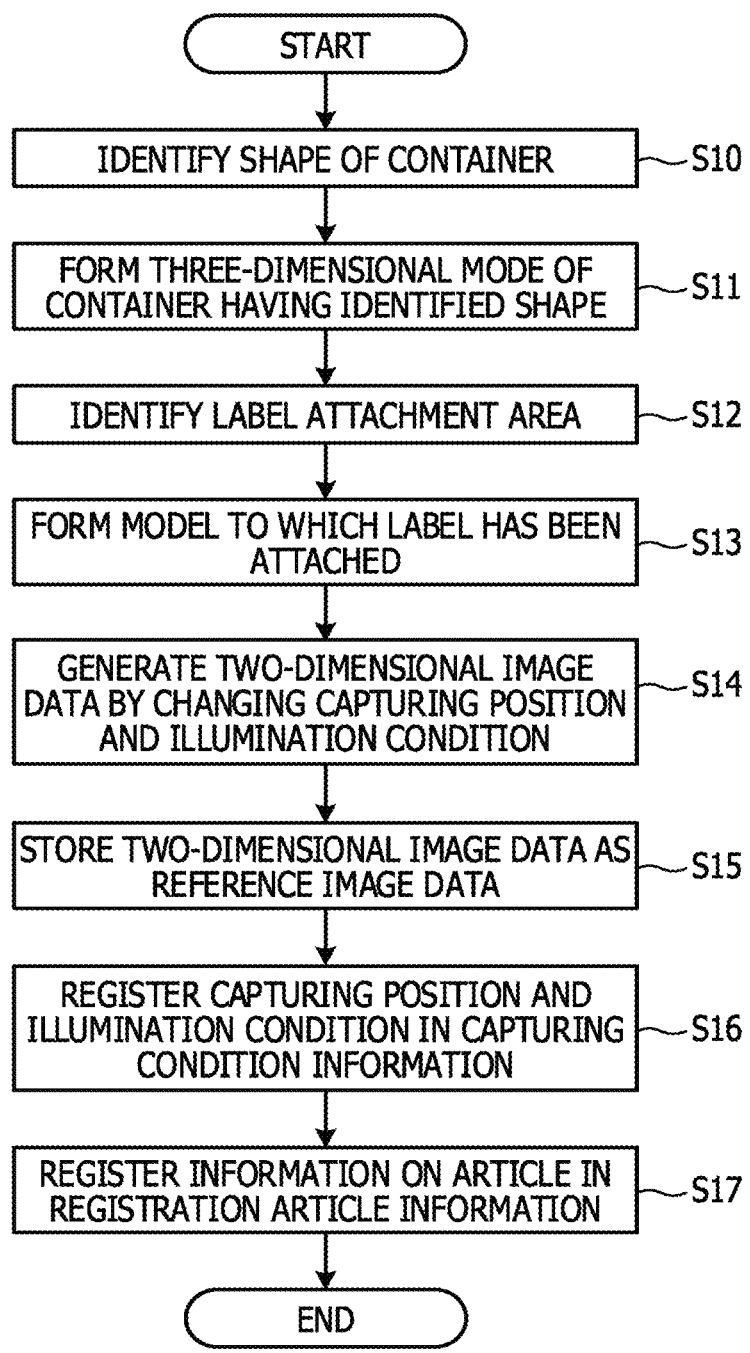
FIG. 14 is a flowchart illustrating an example of a procedure of image generation processing.

A flow of the image generation processing in which the server device 11 according to the embodiment generates a reference image is described below. FIG. 14 is a flowchart illustrating an example of a procedure of the image generation processing. The image generation processing is executed at certain timing, for example, timing at which inputs of various pieces of information on an article for the registration image have been accepted through the registration screen 100, and the OK button 105 has been specified.

As illustrated in FIG. 14, the identification unit 51 reads the shape corresponding to the specified container code from the container information 31 and identifies the shape corresponding to the type of the container (S10).

The generation unit 52 forms a three-dimensional model of the container having the identified shape in a virtual three-dimensional space using three-dimensional space model software (S11). The generation unit 52 reads a label area corresponding to the specified container code from the container information 31 and identifies a reference point of a label attachment area of the container (S12). The generation unit 52 forms a model to which the image of the label has been virtually attached as a texture using the position of the reference point of the formed three-dimensional model of the container as the end of the upper left of the label as a reference (S13). The generation unit 52 generates a plurality of pieces of two-dimensional image data by changing the capturing position and the illumination condition for the formed three-dimensional model (S14).

The generation unit 52 assigns a reference image number to each of the pieces of generated two-dimensional image data and store the two-dimensional image data in the storage unit 23 as the reference image data 32 (S15). The generation unit 52 registers the capturing position and the illumination condition of each of the pieces of reference image data 32 in the capturing condition information 33 (S16). The generation unit 52 registers the name of the article to be registered, the label image number of the label image data 30, the container code of the container of the article to be registered, the message, and the reference image number of each of the pieces of generated reference image data 32 that have been input to the registration screen 100, in the registration article information 34 (S17), and ends the processing.

Figure 15:
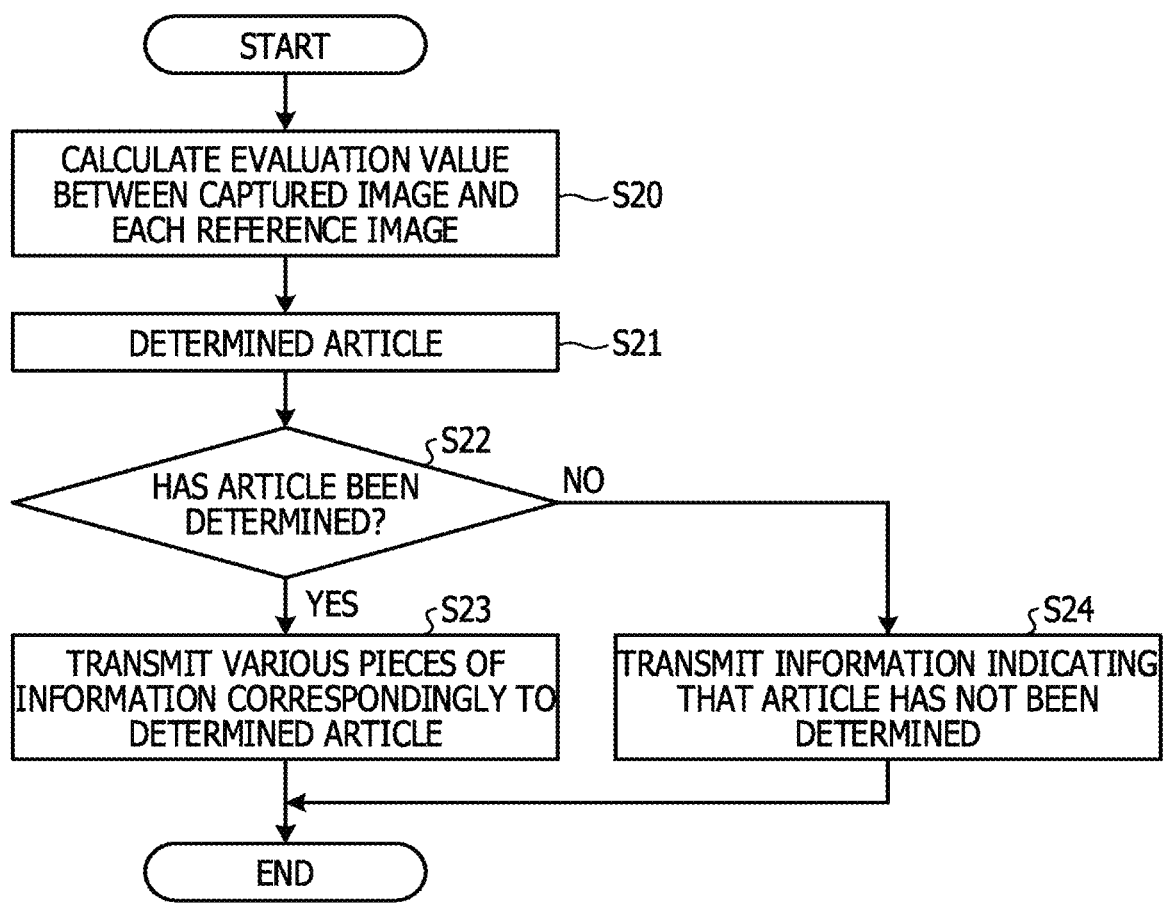
FIG. 15 is a flowchart illustrating an example of a procedure of display control processing.

A flow of the display control processing is described below in which the server device 11 according to the embodiment determines an article in a captured image, and controls display of the terminal device 12 by transmitting information corresponding to a determination result to the terminal device 12. FIG. 15 is a flowchart illustrating an example of a procedure of the display control processing. The display control processing is executed at certain timing, for example, timing at which image data of the capture image that has been transmitted from the terminal device 12 is obtained.

As illustrated in FIG. 15, the evaluation unit 61 calculates an evaluation value indicating a similarity by performing pattern matching between the obtained image data of the captured image and each of the pieces of reference image data 32 (S20). The evaluation unit 61 determines an article based on the calculated evaluation value (S21). For example, when the highest evaluation value is a certain threshold value or more by which an article is determined, the evaluation unit 61 determines an article of the reference image data 32 in which the highest evaluation value has been calculated, to be an article that appears in the captured image.

The output unit 62 determines whether an article has been determined from the captured image by the evaluation unit 61 (S22). When an article has been determined from the captured image (Yes in S22), the output unit 62 transmits various pieces of information to the terminal device 12 that is the transmission source of the captured image, correspondingly to the determined article (S23), and ends the processing. When an article is not determined from the captured image (No in S22), the output unit 62 transmits information indicating that an article has not been determined from the captured image, to the terminal device 12 that is the transmission source of the captured image (S24), and ends the processing.

[Effect]

The server device 11 according to the embodiment accepts inputs of the type of a container and image data of a label. The server device 11 identifies the shape corresponding to the input type of the container. The server device 11 generates two-dimensional image data of the label in a state in which the image data of the label has been distorted, depending on the identified shape. The server device 11 stores the generated two-dimensional image data. As a result, the server device 11 may suppress a generation variation in reference images.

In addition, the server device 11 according to the embodiment virtually attaches the label to the container having the identified shape in the virtual three-dimensional space virtually, and generates a plurality of pieces of two-dimensional image data by changing the capturing position and the illumination condition for the container. As a result, the server device 11 may generate a reference image in a state similar to the state in which the label has been attached to the actual container. In addition, the server device 11 generates a plurality of pieces of two-dimensional image data by changing the capturing position and the illumination condition for the container in the virtual three-dimensional space, so that the work load may be reduced when the capturing is performed actually. In addition, the server device 11 may generate a reference image at the same capturing position and under the same illumination condition in the virtual three-dimensional space for each label, so that occurrence of a variation in the reference images due to factors such as a capturing angle and illumination may be suppressed.

In addition, the server device 11 according to the embodiment generates a plurality of pieces of two-dimensional image data by reducing a change in a capturing position as the capturing position corresponds to the upper position for the label that has been virtually attached to the container. As a result, the server device 11 may generate a reference image in a unit of smaller angle as the angle corresponds to a larger distortion of characters and graphics of the label, so that accuracy of recognition may be improved.

In addition, the server device 11 according to the embodiment obtains a captured image. The server device 11 evaluates a similarity between the obtained captured image and the two-dimensional image data. The server device 11 performs output corresponding to the evaluation result. As a result, when an article that appears in the two-dimensional image data is included in the captured image, the server device 11 may recognize the article with high accuracy.

In addition, the server device 11 according to the embodiment virtually attaches a label to the container having the identified shape of the virtual three-dimensional space and generates a plurality of pieces of two-dimensional image data by changing the capturing position and the illumination condition for the container. The server device 11 obtains a score of a similarity between the obtained captured image and each of the plurality of pieces of two-dimensional image data, and evaluates the similarity by increasing the weight of the score of the two-dimensional image data that has been generated at the capturing position in front of the label that has been virtually attached to the container. As a result, the server device 11 may increase the score for the two-dimensional image data in which the reliability of the evaluation is high.

Second Embodiment

A second embodiment is described below. A configuration of a system 10 according to the second embodiment is similar to that of the first embodiment illustrated in FIG. 1, so that a description is omitted herein.

Figure 16:
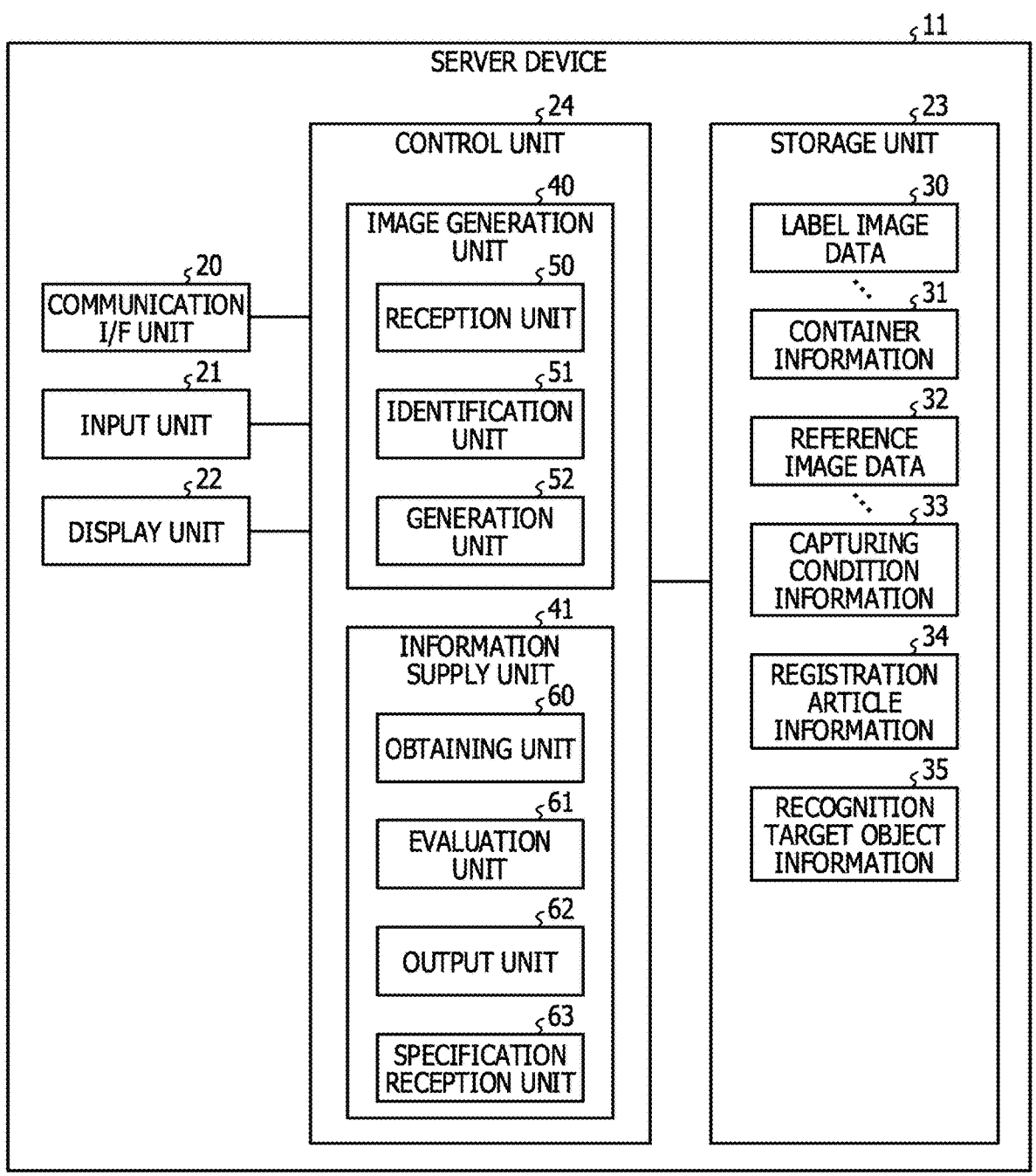
FIG. 16 is a diagram illustrating a schematic configuration of a server device according to a second embodiment.

FIG. 16 is a diagram illustrating a schematic configuration of a server device according to the second embodiment. A configuration of the server device 11 according to the second embodiment is substantially the same as that of the first embodiment illustrated in FIG. 2, so that the same symbol is assigned to a portion similar to that of the first embodiment, and a portion different from that of the first embodiment is mainly described below.

In the embodiment, the information supply unit 41 further includes a specification reception unit 63.

The specification reception unit 63 accepts various types of specification. For example, the specification reception unit 63 accepts specification of a label that is a search target. For example, the specification reception unit 63 causes the display unit 22 to display a specification screen on which a liquor brand stored in the item of "article" of the registration article information 34 is displayed, and accepts specification of the label that is the search target from the input unit 21 through specification of a brand for the specification screen.

The evaluation unit 61 calculates an evaluation value indicating a similarity by performing pattern matching between image data of a captured image and each of the pieces of reference image data 32 of the specified label. When a plurality of containers is included in the captured image, the evaluation unit 61 evaluates a similarity between a label of each of the containers and two-dimensional image data of the specified label. For example, when the highest evaluation value of the container is a certain threshold value or more by which an article is determined, from among evaluation values with the containers, the evaluation unit 61 determines a container having the highest evaluation value to be an article to which the label that is the search target has been attached.

The output unit 62 performs output of the position of the specified label in the captured image, based on the evaluation result by the evaluation unit 61. In the embodiment, the output unit 62 transmits information indicating the position of the article to which the label that is the search target has been attached in the captured image, to the terminal device 12.

The terminal device 12 performs display of the position of the specified label in the captured image, based on the various pieces of information that have been transmitted from the server device 11. For example, the terminal device 12 encloses the article to which the label that is the search target has been attached and displays the position of the article in the captured image.

Figure 17:
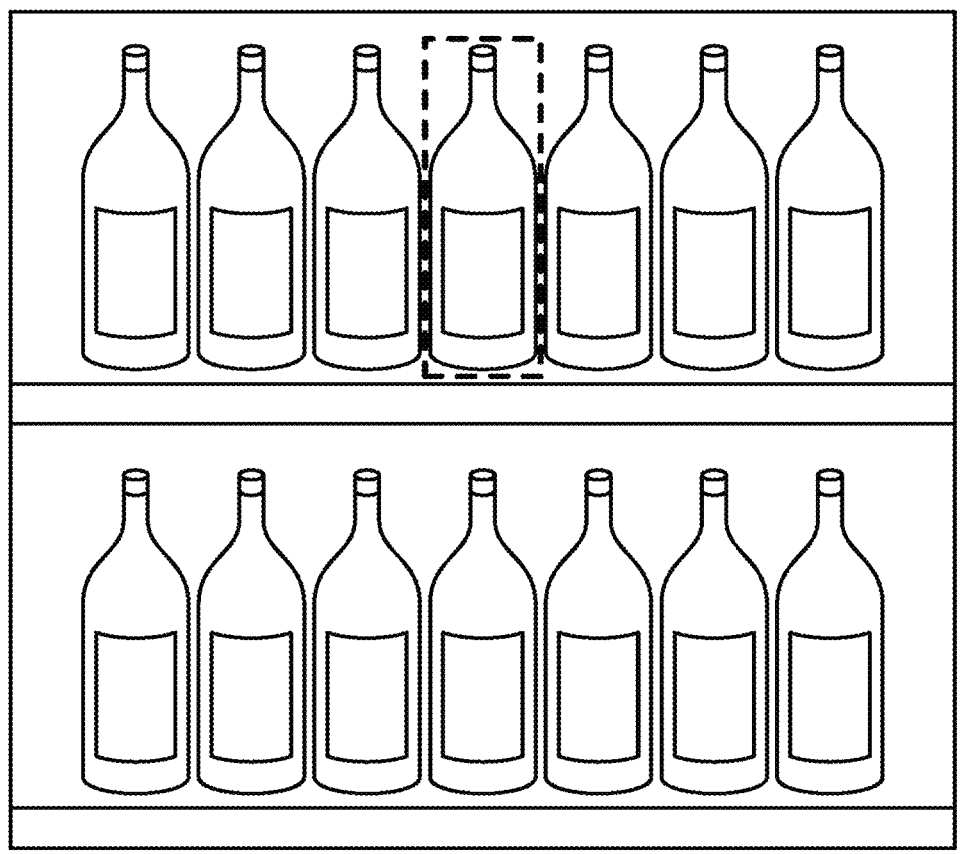
FIG. 17 is a diagram illustrating an example of a screen displayed on the terminal device.

FIG. 17 is a diagram illustrating an example of a screen displayed in the terminal device. In the example of FIG. 17, a plurality of containers of the liquor appears in the captured image, and the position of the container is displayed in the captured image by enclosing the container to which the label that is the search target has been attached by the broken line. As a result, the user of the terminal device 12 may easily know the position at which a brand that is a search target has been arranged by specifying the brand that is the search target and capturing an image of a shelf even when pieces of liquor having a plurality of brands are displayed on the shelf.

[Effect]

The server device 11 according to the embodiment accepts specification of a label that is a search target. When a plurality of containers is included in a captured image, the server device 11 evaluates a similarity between a label of each of the containers and two-dimensional image data of the specified label. The server device 11 outputs the position of the specified label in the captured image, based on the evaluation result. As a result, the user may easily know the position at which the label that is the search target has been arranged.

Third Embodiment

The embodiments of the device discussed herein are described above, but the technology discussed herein may be implemented by various different embodiments other than the above-described embodiments. Therefore, the other embodiments included in the technology discussed herein is described below.

Figure 18:
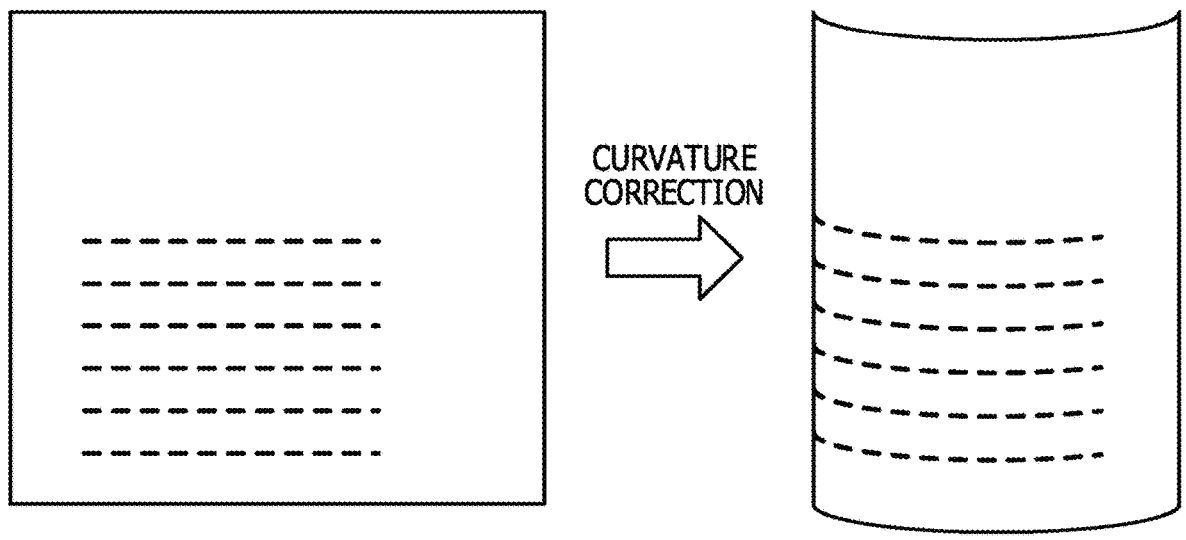
FIG. 18 is a diagram illustrating an example of curvature correction.

For example, in the above-described embodiment, the case in which the reference image data 32 is generated by virtually attaching an image of a label to a three-dimensional model of a container in a virtual three-dimensional space as the texture is described above as an example, but the device discussed herein is not limited to such a case. For example, the generation unit 52 may generate two-dimensional image data of the label by performing curvature correction on the label image indicated by the label image data 30. FIG. 18 is a diagram illustrating an example of the curvature correction. For example, pieces of two-dimensional image data of a label having a plurality of patterns may be generated by changing the position at which the label is curved depending on a capturing position, with a curvature amount corresponding to the shape that has been identified by the identification unit 51, for the label image indicated by the label image data 30.

In addition, in the above-described embodiment, the case in which the same device performs generation of a reference image and image recognition for a captured image is described above as an example, but the device discussed herein is not limited to such a case. For example, generation of a reference image and image recognition for a captured image may be performed in different devices. That is, the image generation unit 40 and the information supply unit 41 may be executed in different devices.

In addition, in the above-described embodiment, the case in which a brand is determined from a label of liquor is described above as an example, but the device discussed herein is not limited to such a case. Here, any article may be determined. For example, a product that is a further cylindrical object to which a label is attached (a PET bottle, a canned juice, and the like) may be applied.

In addition, in the above-described embodiment, the case in which an evaluation value is calculated by performing pattern matching between a captured image and each reference image and whether an article is included in the captured image is determined using the highest evaluation value is described above as an example, but the device discussed herein is not limited to such a case. Whether an article is included in the captured image may be determined using a plurality of evaluation values. For example, whether an article is included in the captured image may be determined using a value that has obtained by combing evaluation values up to a certain upper level in order of a high similarity.

In addition, each of the configuration elements of the illustrated devices is a function-conceptual element, and may not be physically configured as illustrated in the figures. That is, a specific state of variance and integration of the devices is not limited to the illustrated figures, and all or some of the devices may be configured so as to be functionally or physically distributed or integrated in a certain unit of devices depending on various loads, usages, and the like. For example, the processing units such as the reception unit 50, the identification unit 51, and the generation unit 52 of the image generation unit 40, and the obtaining unit 60, the evaluation unit 61, the output unit 62, and the specification reception unit 63 of the information supply unit 41 may be integrated or divided as appropriate. In addition, all or some of the processing functions executed in the processing units are achieved by a CPU and a program analyzed and executed by the CPU, or may be achieved as hardware by wired logic.

[Image Generation Program]

Figure 19:
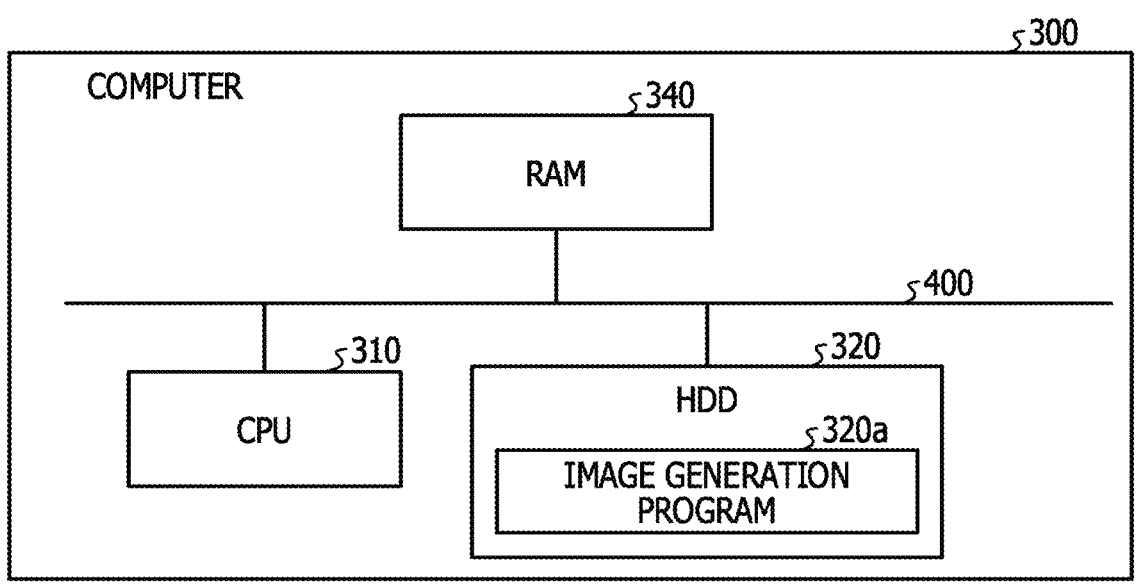
FIG. 19 is a diagram illustrating a computer that executes an image generation program.

In addition, the various pieces of processing devices in the above embodiments may also be achieved by executing a program that has been prepared in advance through a computer system such as a personal computer or a workstation. Therefore, an example of a computer system that executes a program having a function similar to that of the above-described embodiments is described below. FIG. 19 is a diagram illustrating a computer that executes an image generation program.

As illustrated in FIG. 19, a computer 300 includes a CPU 310, a hard disk drive (HDD) 320, and a random access memory (RAM) 340. The units 310 to 340 are coupled to each other through a bus 400.

An image generation program 320a that achieves a function similar to each of the processing units according to the above-described embodiments is stored in the HDD 320 in advance. For example, the image generation program 320a that achieves a function similar to those of the reception unit 50, the identification unit 51, and the generation unit 52 of the image generation unit 40 according to the above-described embodiments is stored in the HDD 320. The image generation program 320a may be divided as appropriate.

In addition, the HDD 320 stores various pieces of data. For example, the HDD 320 stores an OS and various pieces of data.

In addition, an operation similar to each of the processing units according to the embodiments is executed when the CPU 310 reads the image generation program 320a from the HDD 320 and executes the image generation program 320a. That is, the image generation program 320a executes an operation similar to those of the reception unit 50, the identification unit 51, and the generation unit 52 of the image generation unit 40 according to the embodiments.

[Display Control Program]

Figure 20:
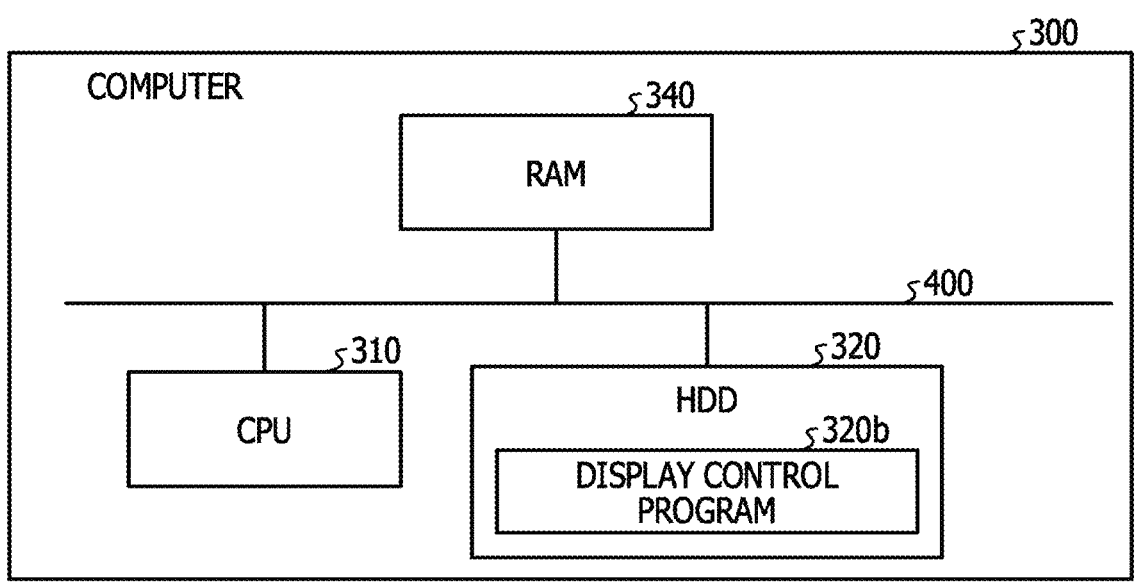
FIG. 20 is a diagram illustrating the computer that executes a display control program.

A display control program is described below. FIG. 20 is a diagram illustrating a computer that executes the display control program. The same symbol is assigned to a portion similar to that of FIG. 19, and a description is omitted herein.

As illustrated in FIG. 20, a display control program 320b that achieves a function similar to those of the reception unit 50, the identification unit 51, and the generation unit 52 of the image generation unit 40 according to the above-described embodiments, and the obtaining unit 60, the evaluation unit 61, the output unit 62, and the specification reception unit 63 of the information supply unit 41 according to the above-described embodiments is stored in the HDD 320. The display control program 320b may be separated as appropriate.

In addition, the HDD 320 stores various pieces of data. For example, the HDD 320 stores an OS and various pieces of data.

In addition, an operation that is similar to each of the processing units according to the embodiments when the CPU 310 reads the display control program 320b from the HDD 320 and executes the display control program 320b. That is, the display control program 320b executes an operation similar to those of the reception unit 50, the identification unit 51, and the generation unit 52 of the image generation unit 40 according to the embodiments, and the obtaining unit 60, the evaluation unit 61, the output unit 62, and the specification reception unit 63 of the information supply unit 41 according to the embodiments.

The above-described image generation program 320a and display control program 320b may not be stored in the HDD 320 from the beginning. For example, the programs are stored in a portable physical medium that is to be inserted into the computer 300 such as a flexible disk (FD), a compact disk read only memory (CD-ROM), a digital versatile disk (DVD), a magneto optical disk, and an integrated circuit (IC) card. In addition, the computer 300 may read the programs from the portable physical medium and execute the programs.

In addition, the programs are stored in a further computer (or a server) or the like coupled to the computer 300 through a public line, the Internet, a LAN, or a wide area network (WAN). In addition, the computer 300 may read the programs from the further computer and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented detection method comprising:
   identifying a shape of an object;
   receiving an image of a label to be attached to the object;

generating one or more images by capturing the image of the label attached to a three-dimensional model, the three-dimensional model being based on the identified shape of the object in a computational space, the image of the label being virtually attached to the object and the image of the label being distorted based on the identified shape of the object;

obtaining a captured image captured by a camera;

performing a detection of whether the captured image includes an image region corresponding to the label in accordance with the one or more images; and outputting a result of the detection, wherein the one or more images are generated by the capturing the received image attached to the three-dimensional model in one or more capturing directions, wherein the one or more directions are determined by changing a first angle and a second angle of the capturing relative to the three-dimensional model of the object, wherein a first virtual line passes through a center of the three-dimensional model of the object along a length of the three-dimensional model of the object, a second virtual line is perpendicular to the first virtual line and passes through a center of the attached image of the label, a third virtual line is perpendicular to both the first virtual line and the second virtual line, and a point of intersection of the first virtual line, the second virtual line, and the third virtual line is an origin point, the first angle corresponds to an angle formed at the origin point between a fourth virtual line of the capturing on a first plane and the second virtual line, the plane being formed by the first virtual line and the second virtual line, and the second angle corresponds to an angle formed at the origin point between a fifth virtual line of the capturing on a second plane and the second virtual line, the second plane formed by the second virtual line and the third virtual line.

2. The detection method of claim 1, wherein when the first angle is increased, a change in the second angle is decreased in the changing relative to the three-dimensional model of the object.

3. The detection method of claim 1, wherein when the first angle is decreased, a change in the second angle is increased in the changing relative to the three-dimensional model of the object.

4. The detection method of claim 1, wherein
the one or more images includes a first number of images captured when the first angle is increased, the first number of images being greater than a second number of images when the first angle is decreased.

5. The detection method of claim 1, wherein the capturing is executed in a predetermined distance from the three-dimensional object.

6. The detection method of claim 1, wherein the shape of the object includes a curve.

7. The detection method of claim 1, further comprising:
assigning each of one or more reference numbers to each of the one or more images; and
storing the one or more images in a memory in association with each of the one or more reference numbers.

8. The detection method of claim 1, further comprising:
generating one or more evaluation values for each of the one or more images by comparing between the captured image and each of the one or more images.

9. The detection method of claim 8, wherein:
the generating of the one or more evaluation values includes assigning a weight to each of the one or more images to generate the one or more evaluation values, each weight being based on a capturing direction in which the one or more images are captured.

10. The detection method of claim 8, wherein
in the detection, a captured image is detected including the image region corresponding to the label in response to at least one of the one or more evaluation values being not less than a threshold.

11. The detection method of claim 1, wherein:
the identifying is executed in accordance with a designated container code.

12. The detection method of claim 1, wherein:
the one or more images are generated by the capturing the received image attached to the three-dimensional model in one or more under illumination conditions.

13. An apparatus for generating a plurality of pieces of two-dimensional data, the apparatus comprising:
circuitry configured to:
identify a shape of an object,
receive an image of a label to be attached to the object,
generate one or more images by capturing the image of the label attached to a three-dimensional model, the three-dimensional model being based on the identified shape of the object in a computational space, the image of the label being virtually attached to the object and the image of the label being distorted based on the identified shape of the object:
obtain a captured image captured by a camera,
detect whether the captured image includes an image region corresponding to the label in accordance with the one or more images,
store the plurality of pieces of two-dimensional image data into a memory, and
output a result of the detection,
wherein the one or more images are generated by the capturing the received image attached to the three-dimensional model in one or more capturing directions,
wherein the one or more directions are determined by changing a first angle and a second angle of the capturing relative to the three-dimensional model of the object,
wherein a first virtual line passes through a center of the three-dimensional model of the object along a length of the three-dimensional model of the object, a second virtual line is perpendicular to the first virtual line and passes through a center of the attached image of the label, a third virtual line is perpendicular to both the first virtual line and the second virtual line, and a point of intersection of the first virtual line, the second virtual line, and the third virtual line is an origin point,
the first angle corresponds to an angle formed at the origin point between a fourth virtual line of the capturing on a first plane and the second virtual line, the plane being formed by the first virtual line and the second virtual line, and
the second angle corresponds to an angle formed at the origin point between a fifth virtual line of the capturing on a second plane and the second virtual line, the second plane formed by the second virtual line and the third virtual line.

14. A non-transitory computer-readable storage medium storing computer-readable instructions that, when executed by a computer, cause a computer to execute a process for generating a plurality of pieces of two-dimensional data, the process comprising:

identifying a shape of an object;
receiving an image of a label to be attached to the object;
generating one or more images by capturing the image of the label attached to a three-dimensional model, the three-dimensional model being based on the identified shape of the object in a computational space, the image of the label being virtually attached to the object and the image of the label being distorted based on the identified shape of the object;
obtaining a captured image captured by a camera;
detecting whether the captured image includes an image region corresponding to the label in accordance with the one or more images;
storing the plurality of pieces of two-dimensional image data into a memory; and
outputting a result of the detection,
wherein the one or more images are generated by the capturing the received image attached to the three-dimensional model in one or more capturing directions,
wherein the one or more directions are determined by changing a first angle and a second angle of the capturing relative to the three-dimensional model of the object,
wherein a first virtual line passes through a center of the three-dimensional model of the object along a length of the three-dimensional model of the object, a second virtual line is perpendicular to the first virtual line and passes through a center of the attached image of the label, a third virtual line is perpendicular to both the first virtual line and the second virtual line, and a point of intersection of the first virtual line, the second virtual line, and the third virtual line is an origin point, the first angle corresponds to an angle formed at the origin point between a fourth virtual line of the capturing on a first plane and the second virtual line, the plane being formed by the first virtual line and the second virtual line, and the second angle corresponds to an angle formed at the origin point between a fifth virtual line of the capturing on a second plane and the second virtual line, the second plane formed by the second virtual line and the third virtual line.

* * * * *